(12) United States Patent
Jintsugawa

(10) Patent No.: US 11,966,649 B2
(45) Date of Patent: Apr. 23, 2024

(54) INFORMATION PROCESSING DEVICE, CONTROL METHOD FOR INFORMATION PROCESSING DEVICE, AND PROGRAM FOR GENERATING AND MANAGING HOT FOLDER

(71) Applicant: SEIKO EPSON CORPORATION, Tokyo (JP)

(72) Inventor: Kei Jintsugawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/160,401

(22) Filed: Jan. 27, 2023

(65) Prior Publication Data
US 2023/0244430 A1 Aug. 3, 2023

(30) Foreign Application Priority Data

Jan. 28, 2022 (JP) .................................. 2022-011656

(51) Int. Cl.
*G06F 3/12* (2006.01)
(52) U.S. Cl.
CPC ............ *G06F 3/127* (2013.01); *G06F 3/1204* (2013.01); *G06F 3/1254* (2013.01)

(58) Field of Classification Search
None
See application file for complete search history.

(56) References Cited

U.S. PATENT DOCUMENTS

2010/0315661 A1 12/2010 Sato
2020/0034087 A1* 1/2020 Iida .................... G06F 3/127

FOREIGN PATENT DOCUMENTS

JP 2010-287111 A 12/2010

* cited by examiner

*Primary Examiner* — Lennin R RodriguezGonzalez
(74) *Attorney, Agent, or Firm* — WORKMAN NYDEGGER

(57) ABSTRACT

A PC that is communicatable with a server device. The PC includes: a PC memory storing a first application; and a PC processor. The PC processor functions as, by executing the first application, a registration unit configured to register a printer, a generation unit configured to automatically generate, for the printer registered by the registration unit, a hot folder for storing a print job transmitted from the server device, and a notification unit configured to notify the server device of path information indicating a folder path of the hot folder generated by the generation unit.

9 Claims, 4 Drawing Sheets

INFORMATION PROCESSING DEVICE, CONTROL METHOD FOR INFORMATION PROCESSING DEVICE, AND PROGRAM FOR GENERATING AND MANAGING HOT FOLDER

The present application is based on, and claims priority from JP Application Serial Number 2022-011656, filed Jan. 28, 2022, the disclosure of which is hereby incorporated by reference herein in its entirety.

BACKGROUND

1. Technical Field

The present disclosure relates to an information processing device, a control method for an information processing device, and a program.

2. Related Art

In the related art, a technique related to a hot folder capable of storing a print job is known. JP-A-2010-287111 discloses an information processing device facilitating creation of a hot folder by installing and setting a printer driver by copying a hot folder template that includes folder attributes.

The hot folder disclosed in JP-A-2010-287111 includes a hot folder for storing a print job transmitted from a server device. However, in a configuration in which the hot folder is manually generated for each print setting as in JP-A-2010-287111, the greater the number of print settings, the more hot folders need to be manually generated in a device communicating with the server device. In this configuration, the greater the number of print settings, the more hot folders need to be managed by the server device and the device communicating with the server device. Therefore, in the configuration in which the hot folder is manually created for each print setting, it may not be easy to generate and manage the hot folder, and printing using the hot folder may not be easily performed.

SUMMARY

According to one aspect for solving the above problems, there is provided an information processing device that is communicatable with a server device. The information processing device includes: a storage unit storing a first program; and a processor, in which the processor functions as, by executing the first program, a registration unit configured to register a printing device, a generation unit configured to automatically generate, for the printing device registered by the registration unit, a hot folder for storing a print job transmitted from the server device, and a notification unit configured to notify the server device of path information indicating a folder path of the hot folder generated by the generation unit.

According to another aspect for solving the above problems, there is provided a control method for an information processing device that is communicatable with a server device. The control method for an information processing device includes: registering a printing device; automatically generating, for the registered printing device, a hot folder for storing a print job transmitted from the server device; and notifying the server device of path information indicating a folder path of the generated hot folder.

According to still another aspect for solving the above problems, there is provided a non-transitory computer-readable storage medium storing a program, the program including: causing a processor of an information processing device that is communicatable with a server device to function as a registration unit configured to register a printing device, a generation unit configured to automatically generate, for the printing device registered by the registration unit, a hot folder for storing a print job transmitted from the server device, and a notification unit configured to notify the server device of path information indicating a folder path of the hot folder generated by the generation unit.

DESCRIPTION OF EXEMPLARY EMBODIMENTS

Figure 1:
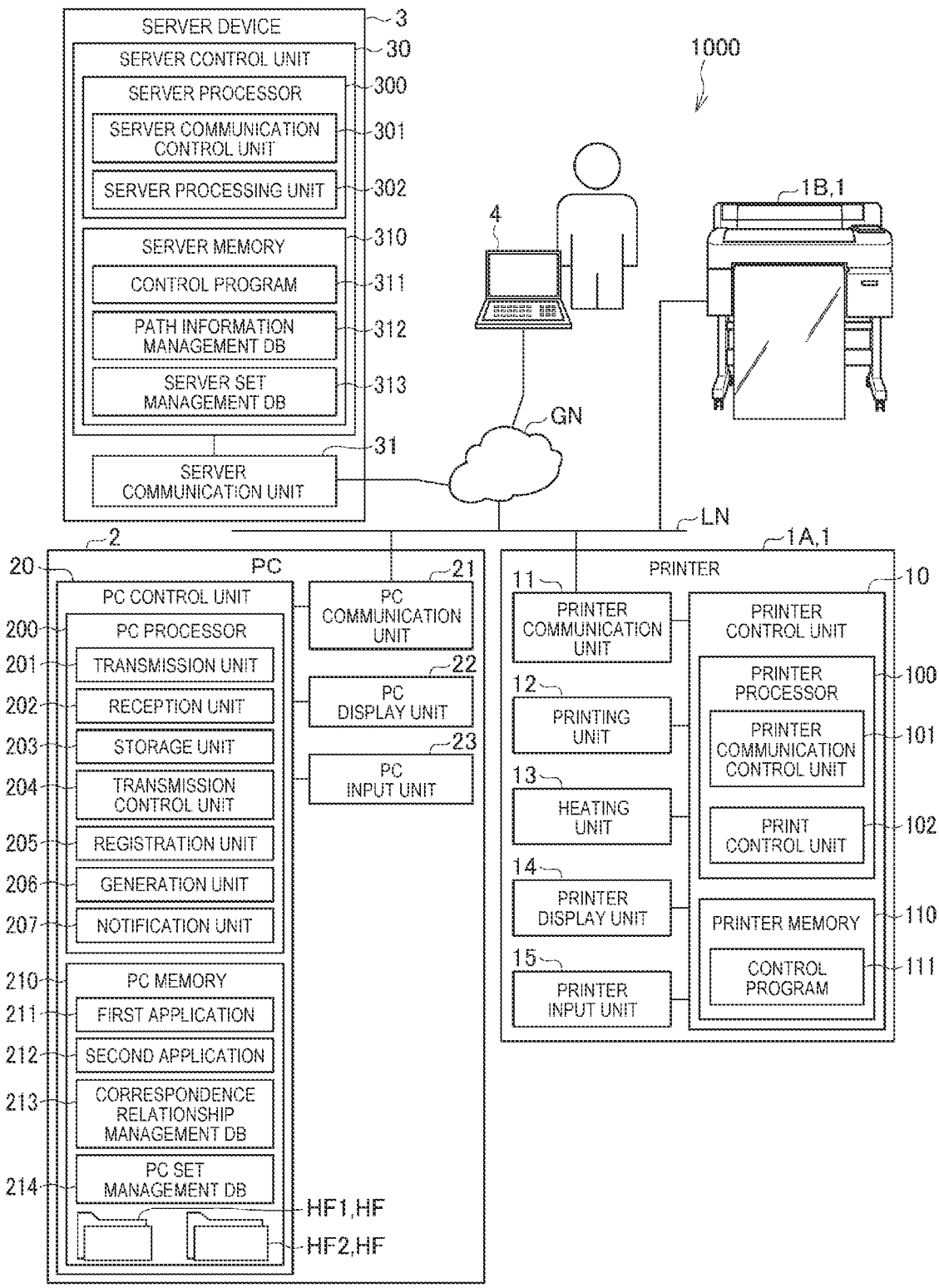
FIG. 1 is a diagram showing a configuration of a printing system.

FIG. 1 is a diagram showing a configuration of a printing system 1000.

The printing system 1000 is a system capable of printing using a hot folder HF. The hot folder HF is a folder for storing a print job to be processed by a printer 1. In the present embodiment, the print job is image data of an image to be printed on a print medium.

The printing system 1000 includes a first printer 1A and a second printer 1B. In the following description, when the first printer 1A and the second printer 1B are not distinguished from each other, the first printer 1A and the second printer 1B are referred to as a "printer" and are denoted by a reference sign "1". The printer 1 is coupled to a local network LN. The local network LN is built in, for example, a printing company.

The printer 1 is an example of a "printing device".

The printer 1 is a large format printer which discharges ink onto a relatively large print medium by an inkjet method to print on the print medium. As the print medium for the large format printer, for example, a print medium can be used such as high-quality paper, cast paper, art paper, coated paper, synthetic paper, a film made of polyethylene terephthalate (PET) or polypropylene (PP), and a fabric.

The printing system 1000 includes a personal computer (PC) 2. The PC 2 may be a desktop, a tablet, a laptop, or a smartphone. The PC 2 is coupled to the local network LN. The PC 2 communicates with a server device 3 via the local network LN and a global network GN. The global network GN is a network such as the Internet, a dedicated circuit, or a public circuit.

The PC 2 is an example of an "information processing device".

The server device 3 executes, based on a request from a client via the global network GN, arithmetic processing. In FIG. 1, each unit of the server device 3 is represented by one block, but this does not necessarily mean that the server device 3 is implemented by a single server device. For example, the server device 3 may include a plurality of server devices having different processing contents.

A terminal device 4 is coupled to the global network GN. In FIG. 1, a laptop device is shown as the terminal device 4, but the terminal device 4 may be a desktop, a tablet, or a smartphone. The terminal device 4 transmits, in accordance with a user operation, a print job stored in the terminal device 4 or a print job stored in an external device coupled to the terminal device 4 to the server device 3.

Configurations of the printer 1, the PC 2, and the server device 3 will be described with reference to FIG. 1. The first printer 1A and the second printer 1B have substantially the same configuration. Therefore, in FIG. 1, a configuration of the first printer 1A is shown as a representative of the configuration of the printer 1, and a configuration of the second printer 1B is omitted.

First, the configuration of the printer 1 will be described.

The printer 1 includes a printer control unit 10, a printer communication unit 11, a printing unit 12, a heating unit 13, a printer display unit 14, and a printer input unit 15.

The printer control unit 10 includes a printer processor 100, which is a processor for executing a program such as a central processing unit (CPU), and a printer memory 110, and controls each unit of the printer 1. The printer processor 100 functions as, by reading and executing a control program 111 stored in the printer memory 110, a printer communication control unit 101 and a print control unit 102.

The printer memory 110 is a memory storing the control program 111 to be executed by the printer processor 100, data to be processed by the printer processor 100, and the like. The printer memory 110 has a nonvolatile storage area. The printer memory 110 may include a volatile storage area, and may constitute a work area of the printer processor 100.

The printer communication unit 11 includes communication hardware conforming to a predetermined communication standard of a communication circuit. The printer communication unit 11 communicates with, under control of the printer control unit 10, the PC 2 via the local network LN.

The printing unit 12 includes a printing mechanism for printing an image on a print medium. The printing unit 12 includes an inkjet head through which ink is discharged, and a conveyance mechanism for conveying the print medium. The printing unit 12 may include various sensors for detecting a position and a size of the print medium, a head scanning mechanism for scanning a print head, and the like. The printing unit 12 prints on, under control of the printer control unit 10, the print medium.

The heating unit 13 includes a heater for drying and fixing the ink on the print medium, and heats, under control of the printer control unit 10, the print medium conveyed in a conveyance path.

The printer display unit 14 is a display implemented by a light emitting diode (LED), an organic LED (OLED), or the like, and displays, under control of the printer control unit 10, information in a predetermined mode. The printer display unit 14 may be an external device coupled to the printer 1.

The printer input unit 15 is an input interface that is coupled to input units such as an operation switch, a touch input panel, a mouse, and a keyboard provided in the printer 1, detects an input operation by a user, and outputs a detection result to the printer control unit 10. The printer control unit 10 executes, based on an input from the printer input unit 15, processing corresponding to the input operation.

As described above, the printer processor 100 functions as the printer communication control unit 101 and the print control unit 102.

The printer communication control unit 101 communicates with, via the printer communication unit 11, the PC 2 coupled to the local network LN. The printer communication control unit 101 receives the print job from the PC 2.

The print control unit 102 controls the printing unit 12 and the heating unit 13 to print on the print medium. The print control unit 102 converts the print job received by the printer communication control unit 101 into print data, and prints based on the converted print data. The print data includes various control commands related to printing.

Next, the configuration of the PC 2 will be described.

The PC 2 includes a PC control unit 20, a PC communication unit 21, a PC display unit 22, and a PC input unit 23.

The PC control unit 20 includes a PC processor 200, which is a processor for executing a program such as a CPU, and a PC memory 210, and controls each unit of the PC 2. The PC processor 200 functions as, by reading and executing a second application 212 stored in the PC memory 210, a transmission unit 201, a reception unit 202, and a storage unit 203. The PC processor 200 functions as, by reading and executing a first application 211 stored in the PC memory 210, a transmission control unit 204, a registration unit 205, a generation unit 206 and a notification unit 207.

The PC processor 200 is an example of a "processor". The PC memory 210 is an example of a "storage unit". The second application 212 is an example of a "second program". The first application 211 is an example of a "first program" and a "program".

The PC memory 210 is a memory. The PC memory 210 stores programs to be executed by the PC processor 200, data to be processed by the PC processor 200, the first application 211, the second application 212, a correspondence relationship management database (DB) 213, a PC set management DB 214, and other information. The PC memory 210 stores the hot folder HF when the hot folder HF is generated. The PC memory 210 of the present embodiment stores a first hot folder HF1 and a second hot folder HF2. The first hot folder HF1 is the hot folder HF in which a print job to be transmitted to the first printer 1A is stored. The second hot folder HF2 is the hot folder HF in which a print job to be transmitted to the second printer 1B is stored. The PC memory 210 has a nonvolatile storage area. The PC memory 210 may include a volatile storage area, and may constitute a work area of the PC processor 200.

The first application 211 is an application program related to printing by the printer 1.

The second application 212 is an application program mediating between the first application 211 and the server device 3.

The correspondence relationship management DB 213 is a database managing a correspondence relationship between the hot folder HF and the printer 1. The correspondence relationship management DB 213 stores one record for each hot folder HF. In the present embodiment, two records are stored for the first hot folder HF1 and the second hot folder HF2. One record stored in the correspondence relationship management DB 213 includes path information indicating a folder path of the hot folder HF and address information of the printer 1.

The PC set management DB 214 is a database for managing a print setting set. The print setting set indicates a combination of a plurality of print settings. For example, one print setting set indicates a combination of a print setting for designating A4 as a sheet of the print medium, a print setting for designating duplex printing, and a print setting for designating color printing. The PC set management DB 214 stores, for each print setting set, information related to the print setting set as one record. One record stored in the PC set management DB 214 includes print setting set information indicating a print setting set, set name information indicating a name of the print setting set, and set identification information which is identification information of the print setting set.

The PC communication unit 21 includes communication hardware conforming to a predetermined communication standard of a communication circuit. The PC communication unit 21 communicates with, under control of the PC control unit 20, the printer 1 via the local network LN. The PC communication unit 21 communicates with the server device 3 via the local network LN and the global network GN.

The PC display unit 22 is a display implemented by an LED, an OLED, or the like, and displays information under control of the PC control unit 20. The PC display unit 22 may be an external device coupled to the PC 2.

The PC input unit 23 is an input interface that is coupled to input units such as an operation switch, a touch input panel, a mouse, and a keyboard provided in the PC 2, detects an input operation by the user, and outputs a detection result to the PC control unit 20. The PC control unit 20 executes, based on an input from the PC input unit 23, processing corresponding to the input operation.

As described above, the PC processor 200 functions as the transmission unit 201, the reception unit 202, the storage unit 203, the transmission control unit 204, the registration unit 205, the generation unit 206, and the notification unit 207.

The transmission unit 201 transmits information to the server device 3 via the PC communication unit 21. The transmission unit 201 acquires, from the notification unit 207, information to be transmitted to the server device 3.

The reception unit 202 receives, via the PC communication unit 21, information from the server device 3. The reception unit 202 of the present embodiment receives print job-related information from the server device 3. The print job-related information includes a print job, path information, and a job definition format (JDF) file. The set identification information is described in the JDF file.

The storage unit 203 stores, based on the print job-related information received by the reception unit 202, the print job in the hot folder HF. Specifically, the storage unit 203 stores the print job in the print job-related information received by the reception unit 202 in the hot folder HF corresponding to a folder path indicated by the path information in the print job-related information. The storage unit 203 stores the print job, in association with the set identification information described in the JDF file of the print job-related information received by the reception unit 202, in the hot folder HF.

The transmission control unit 204 communicates with the printer 1 via the PC communication unit 21. The transmission control unit 204 monitors the hot folder HF and determines whether the print job is stored in the hot folder HF. When the print job is stored in the hot folder HF, the transmission control unit 204 acquires, from the PC set management DB 214, print setting set information associated with the set identification information associated with the stored print job. Next, the transmission control unit 204 acquires, from the correspondence relationship management DB 213, the address information of the printer 1 associated with the path information of the hot folder HF in which the print job is stored. Next, the transmission control unit 204 transmits, based on the acquired address information of the printer 1, the acquired print setting set information and the stored print job to the printer 1.

The registration unit 205 registers the printer 1 in the PC 2. The registration unit 205 automatically registers the printer 1 at a predetermined timing. Here, the predetermined timing is when the first application 211 is installed, when a new printer 1 is coupled to the PC 2, or the like. The registration unit 205 registers the printer 1 by describing information of the printer 1 to be registered in the PC memory 210. The described information of the printer 1 is, for example, a serial number of the printer 1 or the address information of the printer 1. The registration unit 205 communicates with, via the PC communication unit 21, the printer 1 coupled to the local network LN, acquires the serial number of the printer 1, the address information of the printer 1, and the like, and registers the printer 1.

The registration unit 205 registers the print setting set in the PC 2. The registration unit 205 causes the PC display unit 22 to display a user interface for inputting the print setting set, and receives, via the user interface and the PC input unit 23, an input of the print setting set and an input of the name of the print setting set. The registration unit 205 registers the print setting set corresponding to the received input. Specifically, the registration unit 205 generates set identification information, generates a record in which the generated set identification information, the print setting set information indicating the input print setting set, and the set name information indicating the name of the input print setting set are associated with each other, and stores the generated record in the PC set management DB 214.

The registration unit 205 registers the hot folder HF generated by the generation unit 206, which will be described later, in the PC 2. Specifically, the registration unit 205 generates a record in which path information of the hot folder HF generated by the generation unit 206 and address information of the printer 1 corresponding to the hot folder HF generated by the generation unit 206 are associated with each other. The registration unit 205 stores the generated record in the correspondence relationship management DB 213.

The generation unit 206 automatically generates the hot folder HF. The generation unit 206 generates one hot folder HF for each printer 1 registered in the registration unit 205. The generated hot folder HF is stored in the PC memory 210. The generation unit 206 outputs, to the registration unit 205, the generated path information of the hot folder HF and the address information of the printer 1 corresponding to the generated hot folder HF. The generation unit 206 communicates with, via the PC communication unit 21, the printer 1 coupled to the local network LN, and acquires the address information of the printer 1.

The notification unit 207 notifies the server device 3 of various types of information related to the hot folder HF. Specifically, the notification unit 207 passes the information to be notified to the transmission unit 201. The transmission unit 201 transmits the information output from the notification unit 207 to the server device 3. The information notified by the notification unit 207 will be described later.

Next, the configuration of the server device 3 will be described.

The server device 3 includes a server control unit 30 and a server communication unit 31.

The server control unit 30 includes a server processor 300, which is a processor for executing a program such as a CPU, and a server memory 310, and controls each unit of the server device 3. The server processor 300 functions as, by reading and executing a control program 311 stored in the server memory 310, a server communication control unit 301 and a server processing unit 302.

The server memory 310 is a memory. The server memory 310 stores the control program 311 to be executed by the server processor 300, data to be processed by the server processor 300, a path information management DB 312, a server set management DB 313, and the like. The server memory 310 has a nonvolatile storage area. The server memory 310 may include a volatile storage area, and may constitute a work area of the server processor 300.

The path information management DB 312 stores one record for each hot folder HF. One record stored in the path information management DB 312 includes name information of the printer 1 and path information. In the following description, the name information of the printer 1 is referred to as "printer name information".

The server set management DB 313 stores one record for each print setting set registered in the PC 2. Each record stored in the server set management DB 313 includes set name information and set identification information.

The server communication unit 31 includes communication hardware conforming to a predetermined communication standard of a communication circuit. The server communication unit 31 communicates with, under control of the server control unit 30, the PC 2 and the terminal device 4 via the global network GN.

The server communication control unit 301 communicates with the PC 2 and the terminal device 4 via the server communication unit 31.

The server processing unit 302 executes various kinds of processing related to the path information management DB 312 and the server set management DB 313.

Next, an operation of the printing system 1000 will be described.

First, an operation of the PC 2 related to installation of the first application 211 will be described.

Figure 2:
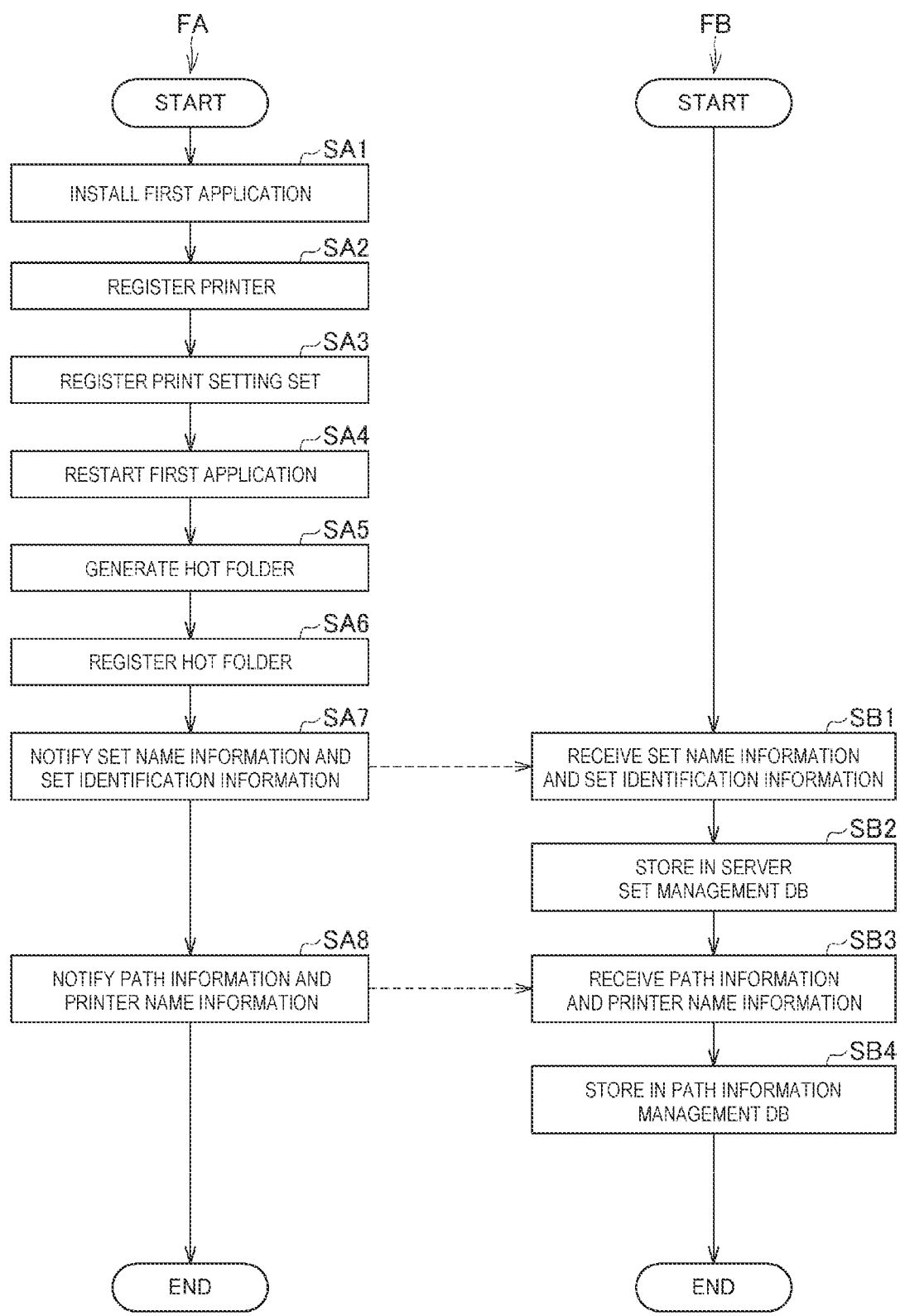
FIG. 2 is a flowchart showing an operation of the printing system.

FIG. 2 is a flowchart showing the operation of the printing system 1000. In FIG. 2, a flowchart FA shows the operation of the PC 2, and a flowchart FB shows an operation of the server device 3.

The PC processor 200 installs the first application 211 (step SA1). The PC processor 200 may acquire the first application 211 to be installed from a storage medium coupled to the PC 2, or may download the first application 211 to be installed from a predetermined device coupled to the global network GN.

After installing the first application 211 in step SA1, the PC processor 200 functions as the transmission control unit 204, the registration unit 205, the generation unit 206, and the notification unit 207.

When the second application 212 is not installed before step SA1, the PC processor 200 installs the second application 212 before or after step SA1.

When the first application 211 is installed, the registration unit 205 registers the printer 1 coupled to the PC 2 (step SA2). For example, as shown in FIG. 1, when the first printer 1A and the second printer 1B are coupled to the PC 2, the registration unit 205 registers each of the first printer 1A and the second printer 1B in step SA2.

Between steps SA1 and SA2, the PC processor 200 may execute, using a function of the first application 211, user authentication of the user using the first application 211. When the user authentication is executed, the PC processor 200 proceeds from step SA1 to step SA2 when the user authentication is successful.

When registering the printer 1, the registration unit 205 registers a print setting set (step SA3). When a plurality of print setting sets are set by an input operation, the registration unit 205 registers each of the plurality of print setting sets in step SA3.

When the registration unit 205 registers the print setting set, the PC processor 200 restarts the first application 211 (step SA4).

After the restart, the generation unit 206 generates the hot folder HF for each printer 1 registered in step SA2 (step SA5). For example, when the first printer 1A and the second printer 1B are registered by the registration unit 205 in step SA2, the generation unit 206 generates the first hot folder HF1 and the second hot folder HF2.

Next, the registration unit 205 registers the hot folder HF generated in step SA5 (step SA6). When a plurality of hot folders HF are generated in step SA5, the registration unit 205 registers each of the plurality of hot folders HF.

Next, the notification unit 207 notifies the server device 3 of set name information and set identification information for each of the print setting sets registered in step SA3 (step SA7).

Next, for each of the hot folders HF registered in step SA6, the notification unit 207 notifies the server device 3 of path information of the hot folder HF and printer name information of the printer 1 corresponding to the hot folder HF (step SA8). The printer name information may be the address information of the printer 1, the serial number of the printer 1, or a model number of the printer 1. The notification unit 207 acquires, by a predetermined method, printer name information from the printer 1.

As shown in the flowchart FB, the server communication control unit 301 of the server device 3 receives, from the PC 2, the set name information and the set identification information (step SB1).

Next, the server processing unit 302 generates a record including the set name information and the set identification information received by the server communication control unit 301, and stores the generated record in the server set management DB 313 (step SB2).

The server communication control unit 301 receives, from the PC 2, the path information and the printer name information (step SB3).

Next, the server processing unit 302 generates a record including the path information and the printer name information received by the server communication control unit 301, and stores the generated record in the path information management DB 312 (step SB4).

As described above, in the present embodiment, the hot folder HF is automatically generated by executing the input related to the print setting set, and the generated hot folder HF is automatically registered in the PC 2. In a related-art setting of the hot folder HF, an input operation of a print setting set, a creation operation of the hot folder HF, and an operation of associating the created hot folder HF with the input print setting set are executed for each print setting set. Therefore, in the related art, a time required for setting the hot folder HF may be prolonged. However, in the present embodiment, a user operation executed in setting of the hot folder HF is only an input related to the print setting set. Therefore, a setting operation of the hot folder HF can be simplified, and a time required for setting the hot folder HF can be shortened.

Next, an operation of the printing system 1000 related to printing using the hot folder HF will be described.

Figure 3:
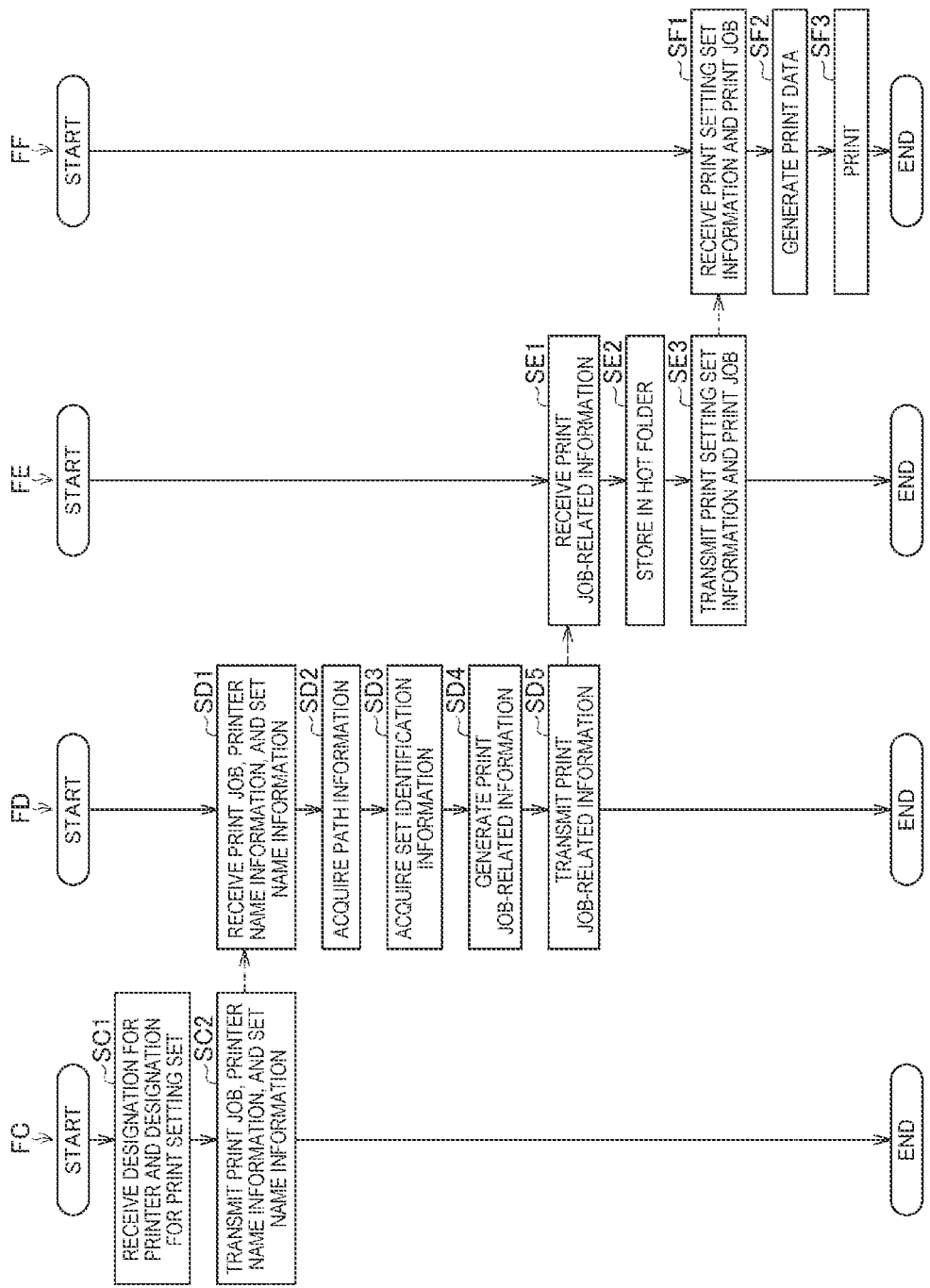
FIG. 3 is a flowchart showing an operation of the printing system.

FIG. 3 is a flowchart showing the operation of the printing system 1000. In FIG. 3, a flowchart FC shows an operation of the terminal device 4, a flowchart FD shows an operation of the server device 3, a flowchart FE shows an operation of the PC 2, and a flowchart FF shows an operation of the printer 1.

As shown in the flowchart FC, the terminal device 4 receives, from the user, a designation for the printer 1 and a designation for the print setting set (step SC1).

In step SC1, the terminal device 4 displays a user interface for receiving the designation for the printer 1 and the designation for the print setting set. The terminal device 4 communicates with the server device 3 and acquires display data for displaying the user interface. When receiving a request for the display data from the terminal device 4, the server device 3 generates display data for the user interface for receiving the designation for the printer 1 and the designation for the print setting set, and transmits the generated display data to the terminal device 4. The user interface is a user interface that displays the printer name information stored in the path information management DB 312, and displays the set name information stored in the server set management DB 313. The user interface receives the designation for the printer 1 when the name information of the printer 1 is selected, and receives the designation for the print setting set when the set name information is selected.

The terminal device 4 transmits a print job to the server device 3 (step SC2). The printer name information of the printer 1 designated in step SC1 and the set name information of the print setting set designated in step SC1 are associated with the print job transmitted in step SC2.

As shown in the flowchart FD, the server communication control unit 301 of the server device 3 receives, from the terminal device 4, the print job, the printer name information, and the set name information (step SD1).

Next, the server processing unit 302 acquires, from the path information management DB 312, path information associated with the printer name information associated with the print job received from the terminal device 4 (step SD2).

Next, the server processing unit 302 acquires, from the server set management DB 313, set identification information associated with the set name information associated with the print job received from the terminal device 4 (step SD3).

Next, the server processing unit 302 generates print job-related information including the path information acquired in step SD2, a JDF file describing a set identification number received in step SC1, and the print job received in step SD1 (step SD4).

Next, the server communication control unit 301 transmits the print job-related information to the PC 2 (step SD5).

As shown in the flowchart FE, the reception unit 202 of the PC 2 receives the print job-related information from the server device 3 (step SE1).

Next, the storage unit 203 stores, in the hot folder HF, the print job in the print job-related information received in step SE1 (step SE2).

Next, the transmission control unit 204 transmits the print job and the print setting set information stored in step SE2 to the printer 1 (step SE3).

As shown in the flowchart FF, the printer communication control unit 101 of the printer 1 receives the print setting set information and the print job from the PC 2 (step SF1).

Next, the print control unit 102 generates print data based on the print setting set information and print job received in step SF1 (step SF2). The print data generated in step SF2 is data for printing the print job received in step SF1 with the print setting set indicated by the print setting set information received in step SF1.

Next, the print control unit 102 prints based on the print data generated in step SF2 (step SF3).

Next, an operation of the printing system 1000 related to synchronization of the set identification information will be described.

Figure 4:
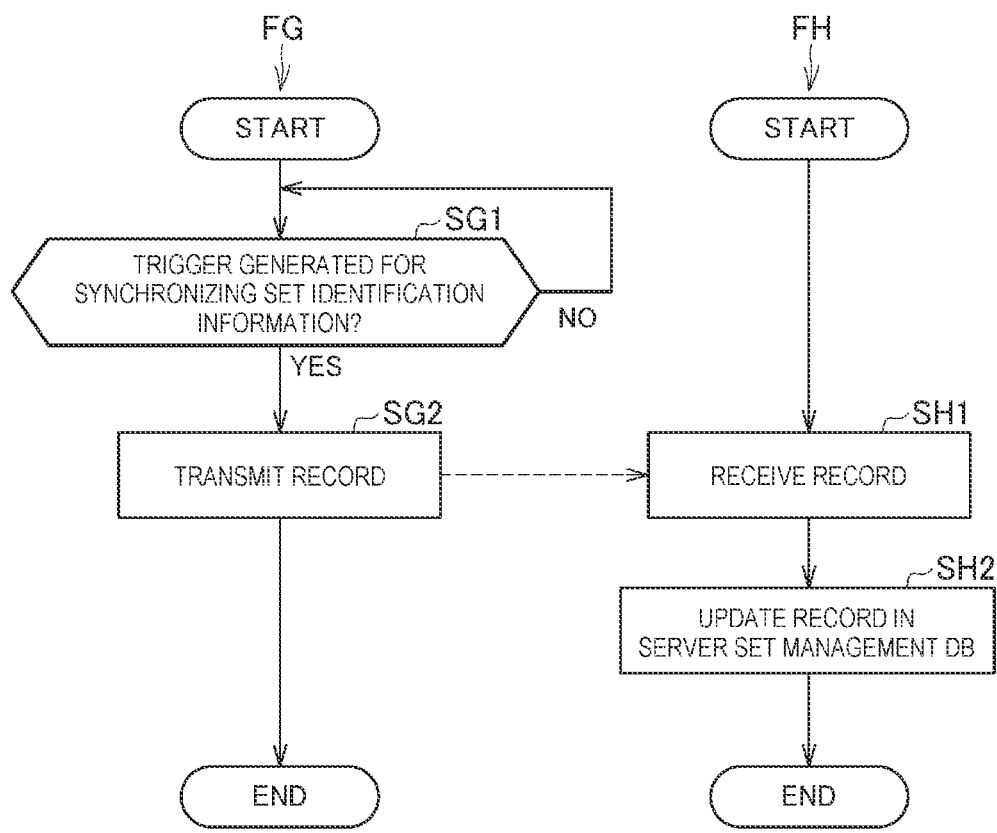
FIG. 4 is a flowchart showing an operation of the printing system.

FIG. 4 is a flowchart showing the operation of the printing system 1000. In FIG. 4, a flowchart FG shows an operation of the PC 2, and a flowchart FH shows an operation of the server device 3.

As shown in the flowchart FG, the notification unit 207 of the PC 2 determines whether a trigger for synchronizing the set identification information is generated (step SG1).

In the present embodiment, triggers for synchronizing the set identification information are a first trigger and a second trigger. The first trigger is that the registration unit 205 newly registers the print setting set. The second trigger is that the first application 211 is started. The notification unit 207 monitors the PC set management DB 214, and determines that the first trigger is generated when a new record is stored in the PC set management DB 214. When the first application 211 is started, the notification unit 207 determines that the second trigger is generated.

When the notification unit 207 determines that a trigger for synchronizing the set identification information is generated (step SG1: YES), the notification unit 207 notifies the server device 3 of all records in the PC set management DB 214. Alternatively, the notification unit 207 first notifies the server device 3 of only the set identification information, and notifies the server device 3, from the PC set management DB 214, of a record associated with the set identification information which is not stored in the server set management DB 313 (step SG2).

As shown in the flowchart FH, the server communication control unit 301 of the server device 3 receives a record from the PC 2 (step SH1).

Next, the server processing unit 302 updates the record stored in the server set management DB 313 to the record received by the server communication control unit 301 (step SH2).

As described above, when the trigger for synchronization is generated, the set identification information is synchronized between the PC 2 and the server device 3. Accordingly, the server device 3 can designate the print setting set registered in the PC 2 as the print setting set to be applied to the print job. Since the set identification information is synchronized between the PC 2 and the server device 3, it is possible to prevent occurrence of an event in which the user of the terminal device 4 cannot designate a print setting set which is to be registered in the PC 2. That is, by synchronizing the set identification information, in the configuration in which the server device 3 transmits the print job to the PC 2, it is possible to apply the print setting set registered in the PC 2 to the print job. In particular, when the first application 211 is started for the first time in a newly used PC 2 and a print setting set is applied to the print job, since the set identification information is synchronized between the existing PC 2 and the server device 3, it is possible to designate the set identification information and apply a print setting set synchronized with that in the server device 3 to the print job. Therefore, it is possible to reduce a time and effort for creating a print setting set one by one in the newly used PC 2.

As described above, the PC 2 can communicate with the server device 3. The PC 2 includes the PC memory 210 storing the first application 211, and the PC processor 200. The PC processor 200 functions as, by executing the first application 211, the registration unit 205 for registering the printer 1, the generation unit 206 for automatically generating, for each printer 1 registered by the registration unit 205, the hot folder HF for storing a print job transmitted from the server device 3, and the notification unit 207 for notifying the server device 3 of path information indicating a folder path of the hot folder HF generated by the generation unit 206.

According to this, the hot folder HF is automatically generated for each printer 1. Therefore, it is not necessary to manually generate, for each print setting set, the hot folder HF for storing the print job transmitted from the server device. Since the number of hot folders HF can be reduced as compared with a configuration in which the hot folder HF is generated for each print setting set, the number of hot folders HF managed by the PC 2 and the server device 3 can be reduced. Therefore, the hot folder HF can be easily generated and managed, and printing using the hot folder HF can be easily performed.

The registration unit 205 registers the print setting set, which is a combination of a plurality of print settings, in the PC 2. The notification unit 207 notifies the server device 3 of the set identification information of the print setting set registered by the registration unit 205.

According to this, when a print job is transmitted from the server device 3, the server device 3 can designate the print setting set registered in the PC 2 as a print setting set to be applied to the print job.

The notification unit 207 notifies, when the registration unit 205 newly registers a print setting set, the server device 3 of the set identification information of the newly registered print setting set.

According to this, since the server device 3 can be notified of the set identification information at an appropriate timing, it is possible to prevent occurrence of an event in which the server device 3 cannot designate the print setting set registered in the PC 2 as the print setting set to be applied to the print job.

The notification unit 207 notifies, when the first application 211 is started, the server device 3 of the set identification information.

According to this, since the server device 3 can be notified of the set identification information at an appropriate timing, it is possible to prevent occurrence of an event in which the server device 3 cannot designate the print setting set registered in the PC 2 as the print setting set to be applied to the print job.

The PC memory 210 stores the second application 212 different from the first application 211. The PC memory 210 stores, for each print setting set registered in the registration unit 205, print setting set information indicating the print setting set. The PC processor 200 functions as, by executing the second application 212, the reception unit 202 receiving the path information, the print job, and the set identification information from the server device 3, and the storage unit 203 storing the print job received by the reception unit 202 and the set identification information received by the reception unit 202 in association with each other in the hot folder HF corresponding to the folder path indicated by the path information received by the reception unit 202. The PC processor 200 further functions as, by executing the first application 211, the transmission control unit 204 transmitting, to the printer 1 corresponding to the hot folder HF in which the storage unit 203 stores the print job, the print setting set information of the print setting set indicated by the set identification information stored in the storage unit 203 and the print job stored in the storage unit 203.

According to this, even in a configuration in which the hot folder HF is generated for each printer 1, it is possible to print with different print setting sets in one printer 1. Therefore, printing using the hot folder HF can be easily performed.

The set identification information is described in the JDF file.

According to this, it is possible to easily perform, by using a standard data format, printing using the hot folder HF.

The generation unit 206 generates the hot folder HF when the first application 211 is started for the first time after the first application 211 is installed.

According to this, it is possible to automatically generate the hot folder HF upon restarting after the first application 211 is installed.

A control method for the PC 2 for communicating with the server device 3 includes: registering the printer 1; automatically generating, for each registered printer 1, the hot folder HF for storing a print job transmitted from the server device 3; and notifying the server device 3 of path information indicating a folder path of the generated hot folder HF.

According to this, a similar effect as an effect of the PC 2 described above is achieved.

The first application 211 causes the PC processor 200 of the PC 2 for communicating with the server device 3 to function as the registration unit 205 for registering the printer 1, the generation unit 206 for automatically generating, for each printer 1 registered by the registration unit 205, the hot folder HF for storing a print job transmitted from the server device 3, and the notification unit 207 for notifying the server device 3 of path information indicating a folder path of the hot folder HF generated by the generation unit 206.

According to this, a similar effect as the effect of the PC 2 described above is achieved.

The above embodiment merely shows a specific example to which the present disclosure is applied. The present disclosure is not limited to a configuration of the embodiment described above, and can be implemented in various modes without departing from the gist of the present disclosure.

In the above-described embodiment, two printers 1 are coupled to the PC 2. However, the number of printers 1 coupled to the PC 2 may be one or three or more. In this configuration, hot folders HF with the number corresponding to the number of printers 1 coupled to the PC 2 are generated in the PC memory 210.

In the above-described embodiment, a large format printer is shown as the printing device, but the printing device may be a multifunction device having various functions such as a printing function and a scanning function, a textile printing machine, or a device printing on a sheet such as A4 or A3.

In the above-described embodiment, the PC 2 is shown as the information processing device, but the information processing device is not limited to the PC 2. The information processing device may be any device capable of communicating with the server device 3.

The printer processor 100, the PC processor 200, and the server processor 300 may be implemented by a single processor, or by a plurality of processors. The printer processor 100, the PC processor 200, and the server processor 300 may be hardware programmed to implement corresponding functional units. That is, the printer processor 100, the PC processor 200, and the server processor 300 may be implemented by, for example, an application specific integrated circuit (ASIC) or a field programmable gate array (FPGA).

Each unit of the printer 1, the PC 2, and the server device 3 shown in FIG. 1 is an example, and a specific implementation form is not particularly limited. That is, it is not always necessary to individually implement corresponding hardware for each unit, and it is of course possible to adopt a configuration in which functions of each unit are implemented by one processor for executing a program. A part of the functions implemented by software in the above-described embodiment may be implemented by hardware, or a part of the functions implemented by hardware may be implemented by software. In addition, specific detailed configurations of other units of the printer 1, the PC 2, and the server device 3 can also be freely changed.

Step units of the operations shown in FIGS. 2 to 4 are divided according to main processing contents in order to facilitate understanding of the operations of the units of the printing system 1000, and the present disclosure is not limited by a way of dividing processing units and names of the processing units. Processing may be divided into more step units according to the processing contents. One step unit may be divided so as to include more processing. An order of steps may be appropriately changed within a range that does not interfere with the gist of the present disclosure.

What is claimed is:

1. An information processing device that is communicatable with a server device, the information processing device comprising:
    a storage unit storing a first program; and
    a processor, wherein
    the processor functions as, by executing the first program,
        a registration unit configured to register a printing device,
        a generation unit configured to automatically generate, for the printing device registered by the registration unit, a hot folder for storing a print job transmitted from the server device,
        a notification unit configured to notify the server device of path information indicating a folder path of the hot folder generated by the generation unit, and
        a transmission control unit configured to transmit, to the printing device corresponding to the hot folder in which the print job is stored by the storage unit, the print job stored by the storage unit.

2. The information processing device according to claim 1, wherein
    the registration unit registers a print setting set, which is a combination of a plurality of print settings, in the information processing device, and
    the notification unit notifies the server device of identification information of the print setting set registered by the registration unit.

3. The information processing device according to claim 2, wherein
    the notification unit notifies, when the registration unit newly registers a print setting set, the server device of identification information of the print setting set.

4. The information processing device according to claim 2, wherein
    the notification unit notifies, when the first program is started, the server device of identification information of the print setting set.

5. The information processing device according to claim 2, wherein
    the storage unit stores a second program different from the first program,
    the storage unit stores, for the print setting set registered in the registration unit, print setting set information indicating the print setting set,
    the processor functions as, by executing the second program,
        a reception unit configured to receive the path information, the print job, and identification information of the print setting set from the server device, and
        a storage unit configured to store the print job received by the reception unit and the identification information of the print setting set received by the reception unit in the hot folder corresponding to the folder path indicated by the path information received by the reception unit, and
    the transmission control unit configured to transmit, to the printing device corresponding to the hot folder in which the print job is stored by the storage unit, the print setting set information of the print setting set indicated by the identification information of the print setting set stored by the storage unit.

6. The information processing device according to claim 5, wherein
    the identification information is described in a job definition format file.

7. The information processing device according to claim 1, wherein
    the generation unit generates the hot folder when the first program is started for a first time after the first program is installed.

8. A control method for an information processing device that is communicatable with a server device, the control method for an information processing device comprising:
    registering a printing device;
    automatically generating, for the registered printing device, a hot folder for storing a print job transmitted from the server device;
    notifying the server device of path information indicating a folder path of the generated hot folder; and
    transmitting, to the printing device corresponding to the hot folder in which the print job is stored by a storage unit, the print job stored by the storage unit.

9. A non-transitory computer-readable storage medium storing a program, the program comprising:
    causing a processor of an information processing device that is communicatable with a server device to function as
        a registration unit configured to register a printing device,
        a generation unit configured to automatically generate, for the printing device registered by the registration unit, a hot folder for storing a print job transmitted from the server device,
        a notification unit configured to notify the server device of path information indicating a folder path of the hot folder generated by the generation unit, and
        a transmission control unit configured to transmit, to the printing device corresponding to the hot folder in which the print job is stored by the storage unit, the print job stored by the storage unit.

* * * * *